United States Patent
Vosoughi et al.

(10) Patent No.: US 11,138,694 B2
(45) Date of Patent: Oct. 5, 2021

(54) METHOD AND APPARATUS FOR GEOMETRIC SMOOTHING

(71) Applicant: Tencent America LLC, Palo Alto, CA (US)

(72) Inventors: Arash Vosoughi, San Jose, CA (US); Sehoon Yea, Palo Alto, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 157 days.

(21) Appl. No.: 16/567,797

(22) Filed: Sep. 11, 2019

(65) Prior Publication Data

US 2020/0184604 A1    Jun. 11, 2020

Related U.S. Application Data

(60) Provisional application No. 62/775,868, filed on Dec. 5, 2018, provisional application No. 62/775,875, filed on Dec. 5, 2018.

(51) Int. Cl.
*G06T 5/00*      (2006.01)
*H04N 19/59*    (2014.01)
(Continued)

(52) U.S. Cl.
CPC .............. *G06T 5/002* (2013.01); *G06T 5/30* (2013.01); *H04N 19/182* (2014.11); *H04N 19/59* (2014.11); *G06T 2207/10028* (2013.01)

(58) Field of Classification Search
CPC ........... G06T 5/002; G06T 5/30; H04N 19/59; H04N 19/182; H04N 19/136;
(Continued)

(56) References Cited

U.S. PATENT DOCUMENTS 5,601,083 A     2/1997 Anderson
10,474,160 B2 * 11/2019 Huang ...................... G06T 3/40
(Continued)

FOREIGN PATENT DOCUMENTS

CN    111435992  *  7/2020  ............. H04N 19/42
CN    111726615  *  9/2020  ........... H04N 19/136
(Continued)

OTHER PUBLICATIONS

Smith et al., "3D Object Super-Resolution", arXiv:1802.09987v1 [cs.CV] Feb. 27, 2018. Retrieved on Jan. 27, 2020. Retrieved from <URL: https://128.84.21.199/pdf/1802.09987v1.pdf> (9 pages).
(Continued)

*Primary Examiner* — Jerome Grant, II
(74) *Attorney, Agent, or Firm* — Oblon, McClelland, Maier & Neustadt, L.L.P.

(57) ABSTRACT

A method of video decoding performed in a video decoder includes receiving compressed geometric data corresponding to a three dimensional (3D) space. The method further includes receiving a low resolution occupancy map associated with the data cloud. The method further includes converting the low resolution occupancy map to a high resolution occupancy map. The method further includes reconstructing a point cloud using the compressed geometric data and the high resolution occupancy map. The method further includes performing a smoothing operation on one of the (i) reconstructed point cloud and (ii) the high resolution occupancy map.

20 Claims, 18 Drawing Sheets

(51) Int. Cl.
*G06T 5/30* (2006.01)
*H04N 19/182* (2014.01)

(58) Field of Classification Search
CPC .. H04N 19/176; H04N 19/192; H04N 19/117; C06T 2207/10028
USPC ........................................................ 382/275
See application file for complete search history.

(56) References Cited

U.S. PATENT DOCUMENTS

| | | | |
|---|---|---|---|
| 2001/0038705 A1* | 11/2001 | Rubbert | A61C 7/00 382/128 |
| 2011/0069152 A1 | 3/2011 | Wang et al. | |
| 2012/0057852 A1 | 3/2012 | Devleeschouwer et al. | |
| 2015/0110367 A1 | 4/2015 | Kumar et al. | |
| 2016/0178355 A1* | 6/2016 | Ge | G06K 9/2036 348/136 |
| 2017/0347120 A1 | 11/2017 | Chou et al. | |
| 2018/0286107 A1* | 10/2018 | Hemmer | H04N 19/124 |
| 2019/0102692 A1* | 4/2019 | Kwant | G06N 20/00 |
| 2020/0045290 A1* | 2/2020 | Ruhm | H04N 13/161 |
| 2020/0221133 A1* | 7/2020 | Vosoughi | H04N 21/4402 |
| 2020/0380765 A1* | 12/2020 | Thudor | G06T 17/10 |

FOREIGN PATENT DOCUMENTS

| | | | | |
|---|---|---|---|---|
| EP | 1 646 245 A1 | | 4/2006 | |
| WO | WO2020143725 | * | 7/2020 | ........... H04N 19/597 |
| WO | WO2020180721 | * | 9/2020 | ............ H04N 19/61 |

OTHER PUBLICATIONS

International Search Report and Written Opinion dated Feb. 18, 2020 in corresponding WO Application No. PCT/US2019/064433 (10 pages).

Mammou et al., "Point Cloud Compression: Test Model Category 2 version 0.0," ISO/IEC JTC1/SC29/WG11 m41920, Oct. 2017, Macau, China (8 pages).

Mekuria et al., "Requirements for Point Cloud Compression," ISO/IEC JTC1/SC29/WG11 MPEG2016/n16330 Feb. 2016, Geneva, CH (3 pages).

Tulvan et al., "Use Cases for Point Cloud Compression (PCC)," ISO/IEC JTC1/SC29/WG11 MPEG2015/N16331 Jun. 2015, Geneva, CH (8 pages).

* cited by examiner

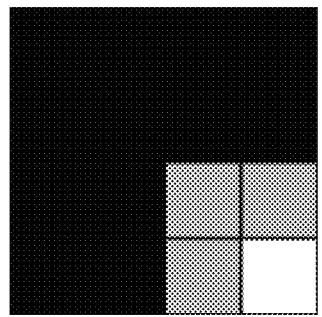
FIG. 13B
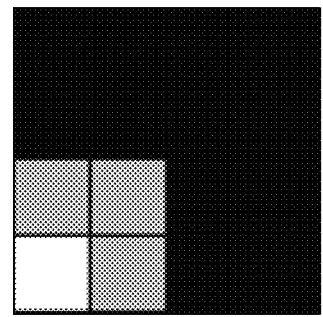
FIG. 13D
FIG. 13A
FIG. 13C
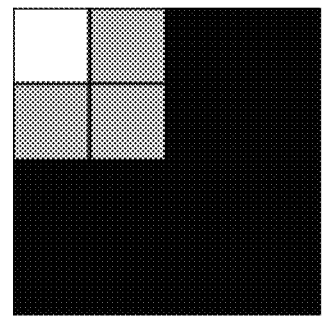

METHOD AND APPARATUS FOR GEOMETRIC SMOOTHING

INCORPORATION BY REFERENCE

This present disclosure claims the benefit of priority to a series of U.S. Provisional Application Nos. 62/775,868, filed on Dec. 5, 2018 and 62/775,875, filed Dec. 5, 2018, each of which are incorporated by reference herein in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Three-dimensional (3D) representations of the world are enabling more immersive forms of interaction and communication, and also allow machines to understand, interpret and navigate the world. Point clouds have emerged as one of type of 3D enabling representation. The Moving Picture Experts Group (MPEG) has identified a number of use cases associated with point cloud data, and developed corresponding requirements for point cloud representation and compression.

SUMMARY

According to an exemplary embodiment of the present disclosure, a method of video decoding performed in a video decoder includes receiving compressed geometric data corresponding to a three dimensional (3D) space. The method further includes receiving a low resolution occupancy map associated with the data cloud. The method further includes converting the low resolution occupancy map to a high resolution occupancy map. The method further includes reconstructing a point cloud using the compressed geometric data and the high resolution occupancy map. The method further includes performing a smoothing operation on one of the (i) reconstructed point cloud and (ii) the high resolution occupancy map.

According to an exemplary embodiment of the present disclosure, a video decoder includes processing circuitry configured to receive compressed geometric data corresponding to a three dimensional (3D) space. The processing circuitry is further configured to receive a low resolution occupancy map associated with the data cloud. The processing circuitry is further configured to convert the low resolution occupancy map to a high resolution occupancy map. The processing circuitry is further configured to reconstruct a point cloud using the compressed geometric data and the high resolution occupancy map. The processing circuitry is further configured to perform a smoothing operation on one of the (i) reconstructed point cloud and (ii) the high resolution occupancy map.

According to an exemplary embodiment of the present disclosure, a non-transitory computer readable medium having instructions stored therein, which when executed by a processor in a video decoder, causes the processor to execute a method that includes receiving compressed geometric data corresponding to a three dimensional (3D) space. The method further includes receiving a low resolution occupancy map associated with the data cloud. The method further includes converting the low resolution occupancy map to a high resolution occupancy map. The method further includes reconstructing a point cloud using the compressed geometric data and the high resolution occupancy map. The method further includes performing a smoothing operation on one of the (i) reconstructed point cloud and (ii) the high resolution occupancy map.

BRIEF DESCRIPTION OF THE DRAWINGS

Further features, the nature, and various advantages of the disclosed subject matter will be more apparent from the following detailed description and the accompanying drawings in which:

FIGS. 13A-13D show an exemplary adaptive erosion filter applied to the occupied corner points in accordance with embodiments of the present disclosure.

DETAILED DESCRIPTION OF EMBODIMENTS

Point cloud data is used to represent a three-dimensional (3D) scene or object in some emerging applications such as immersive virtual reality (VR)/augmented reality (AR)/mixed reality (MR), automotive/robotic navigation, medical imaging, and the like. A point cloud includes a collection of individual 3D points. Each point is associated with a set of 3D coordinates indicating a 3D position of the respective point and a number of other attributes such as color, surface normal, opaque, reflectance, etc. In various embodiments, input point cloud data can be quantized and subsequently organized into a 3D grid of cubic voxels that can be described using an octree data structure. A resulting voxelized octree facilitates the traversal, search, and access of the quantized point cloud data.

Figures 1A, 1B:
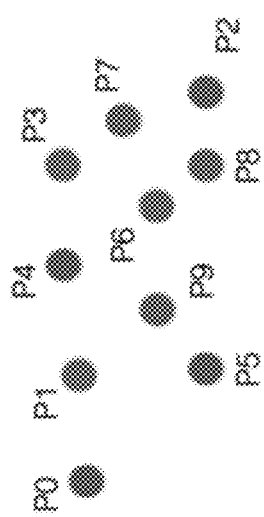
FIG. 1A shows an example point cloud.
FIG. 1B shows a recursive subdivision process in accordance with an embodiment.

A point cloud is a set of points in a 3D space, each with associated attributes, e.g. color, material properties, etc. FIG. 1A illustrates an example point cloud with points P0-P8. Point clouds can be used to reconstruct an object or a scene as a composition of such points. They can be captured using multiple cameras and depth sensors in various setups, and may be made up of thousands and even billions of points in order to realistically represent reconstructed scenes.

Compression technologies are needed to reduce the amount of data required to represent a point cloud. As such, technologies are needed for lossy compression of point clouds for use in real-time communications and six Degrees of Freedom (6 DoF) virtual reality. In addition, technologies are sought for lossless point cloud compression in the context of dynamic mapping for autonomous driving and cultural heritage applications, etc. Further, standards are needed to address compression of geometry and attributes (e.g., colors and reflectance), scalable/progressive coding, coding of sequences of point clouds captured over time, and random access to subsets of the point cloud.

FIG. 1B illustrates an example of a 2D occupancy map 110. The occupancy map may be a binary 2D image where 1's and 0's represent occupied and unoccupied pixels, respectively. Back projection may be used to reconstruct the point cloud using the 2D occupancy map 110 and the geometry video.

According to some embodiments, video codecs compress geometry, motion, and texture information of a dynamic point cloud as three separate video sequences. The extra metadata needed to interpret the three video sequences (i.e., occupancy map and auxiliary patch information) may be compressed separately. The metadata information may represent a small amount of an overall bitstream, and the metadata could be efficiently encoded/decoded by using a software implementation. The bulk of the information may be handled by the video codec.

Figure 2:
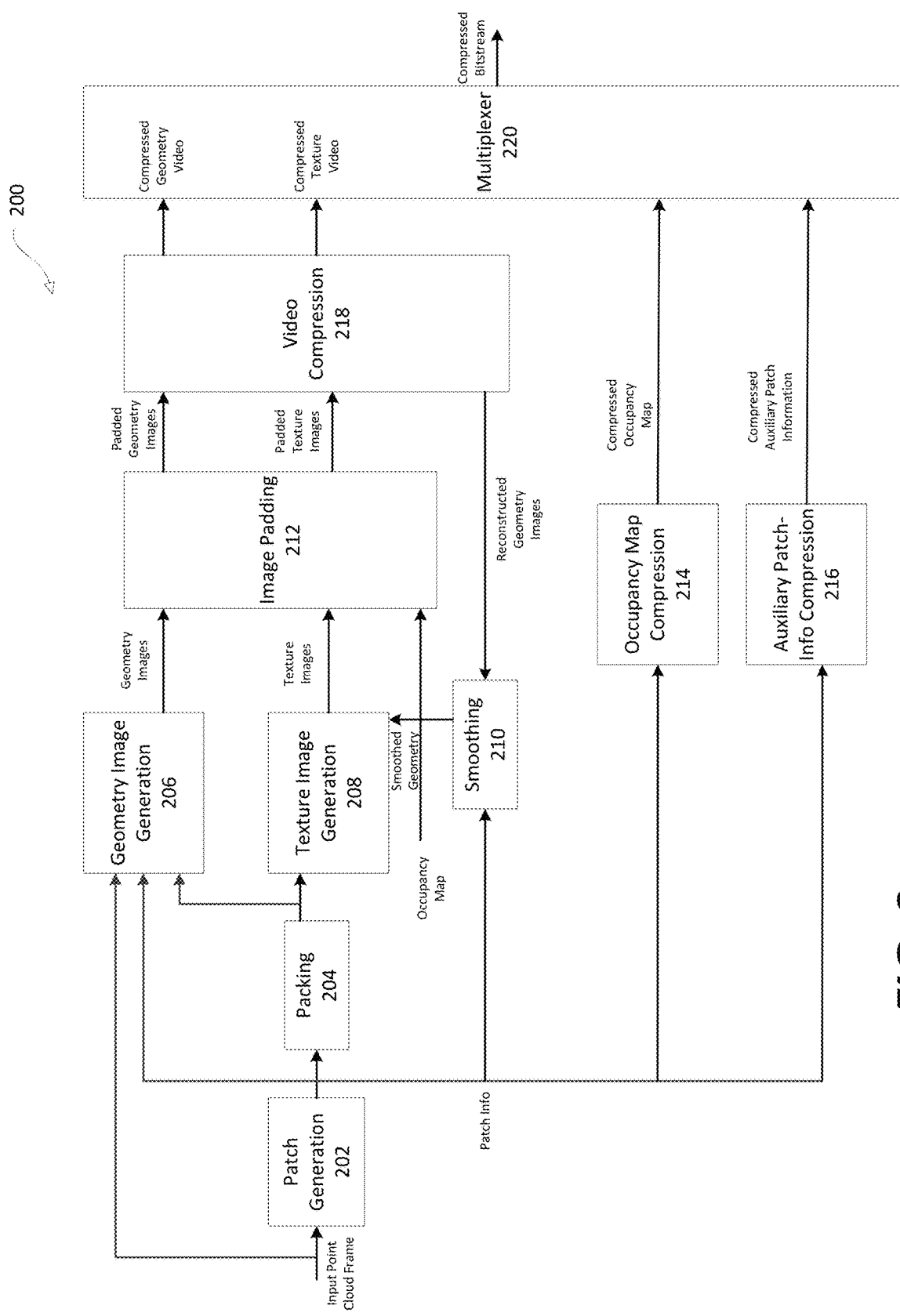
FIG. 2 shows an exemplary video codec in accordance with an embodiment.

FIG. 2 illustrates an embodiment of a video codec 200. A point cloud frame is inputted into a patch generation unit 202 to generate patches from the point cloud frame. After the patch generation is performed, a packing unit 204 receives the output from the patch generation unit 202 to perform a packing process on the patches. The output of the packing unit 204 is fed into texture image generation unit 208. The texture image generation unit 208 receives smoothed geometry from smoothing unit 210 and outputs texture images to image padding 212. For example, geometry is first reconstructed using the decompressed geometry video and decompressed occupancy map. Geometry smoothing is applied on the resulting cloud to alleviate distortion due to video codec compression artifacts at patch boundaries. Geometry image generation unit 206 receives inputs from the point cloud frame, patch info, and the output of the packing unit 204. Patch info may include information such as patch origin along with a shift with respect to an origin of the image, patch size, etc. Geometry image generation 206 outputs geometry images to image padding unit 212. The image padding unit 212 further receives an occupancy map. Image padding unit 212 outputs padded geometry images and padded texture images to video compression unit 218. Video compression unit 218 outputs compressed geometry video and compressed texture video to multiplexer 220. The video compression unit 218 further feeds back reconstructed geometry images to smoothing unit 210. Occupancy map compression unit 214 receives patch info, and outputs a compressed occupancy map to multiplexer 220. Auxiliary patch info compression 216 receives patch info and outputs compressed auxiliary patch information to multiplexer 220. The multiplexer 220 outputs a compressed bitstream.

According to some embodiments, a patch generation process decomposes a point cloud into a minimum number of patches with smooth boundaries, while also minimizing a reconstruction error. Encoders may implement various methods to generate this type of decomposition.

Figure 3:
FIG. 3 shows an example of mapping of patches onto a two-dimensional (2D) grid.

According to some embodiments, a packing process maps the patches onto a 2D grid, as illustrated in FIG. 3, while minimizing unused space, and guaranteeing that every M×M (e.g., 16×16) block of the grid is associated with a unique patch. M may be an encoder defined parameter that is encoded in a bitstream and sent to the decoder. In FIG. 3, patches may be readily distinguished from the background. In some examples, the occupancy map is a binary image with exactly the same dimensions as the image in FIG. 3, where any pixel that belongs to a patch is set to 1, and any pixel that belongs to the background is set to 0. The aforementioned occupancy map may be full-resolution map. However, for lossy compression, the full-resolution occupancy map may be down-sampled and then compressed. At the decoder, the occupancy map may be decompressed and up-sampled back to the original full-resolution. For lossless compression, however, the occupancy map is coded with the original full-resolution format.

After compression of geometry video, the point cloud is reconstructed using the compressed geometry video and the corresponding occupancy map (we refer to this point cloud as geometry-reconstructed cloud). Colors are then transferred to the resulting geometry-reconstructed cloud. Geometry smoothing may be applied on the geometry-reconstructed cloud before color-transfer. The goal of geometry smoothing is to recover the geometry distorted at patch boundaries, which is due to geometry compression as well as conversion of a high-resolution occupancy map to a lower-resolution one. Embodiments of the present disclosure are directed to an improved smoothing strategy that provides an enhanced geometry-reconstructed cloud which in turn leads to a higher-quality compressed texture-video.

According to some embodiments, a 3D smoothing filter is applied multiple times to a reconstructed point cloud in an iterative fashion to improve the quality of geometry smoothing. In some embodiments, different smoothing filters for different iterations are utilized to benefit from unique characteristics of each smoothing filter.

A smoothing filter operates to move a point to a nearby location according to a set of neighboring points. One approach is to compute a local average (i.e., centroid) of the set of neighboring points and move the current point to the centroid. Local statistics may be computed using the nearest neighbors of the current point. The nearest neighbors may be determined by putting a sphere or a cube around the current point, where for the case of sphere, a KD-tree is derived first.

According to some embodiments, multiple iterations of a geometry smoothing filter are applied both at the encoder and decoder. Each iteration may use the same smoothing filter, or a different filter. The same iterative set of filters applied at the encoder is applied at the decoder in an identical manner.

In some embodiments, different smoothing filters such as an average filter and median filter are applied for different iterations. In one example, a median filter applied in the first iteration helps to remove the outliers, followed by the average filter applied in the second iteration. An outlier point may be a point that is located relatively far from the population (e.g., point is located from a population by more than a distance threshold. A median filter may be used for 1D signals to decrease the effect of outlier points. For higher dimensions, for example 3D, the vector median is used, which is a generalization of the 1D median filter. In another example, the average filter is applied in the first iteration and the median filter is applied in the second iteration.

With an average filter, a current point p may be moved to a centroid of the current point's nearest neighbors including p itself as follows:

$$p \rightarrow \frac{\sum_{x \in ne(p)} x}{|ne(p)|},\qquad \text{Eq. 1}$$

where ne(p) indicates the set of nearest neighbors of p including itself and |ne(p)| is the cardinality of that set.

For a median filter, a current point p is moved to a vector median of the current point's nearest neighbors (including itself) as follows:

$$p \rightarrow \arg\min_{x \in ne(p)} \sum_{y \in ne(x)} \|x - y\|,\qquad \text{Eq. 2}$$

where $\|v\|$ represents the norm of vector v. Based on Eq. 2, if the current point is an outlier, the current point is moved to the location of the best inlier point. The best inlier point is a neighbor point whose sum of distances from the rest of the neighbors is the least. An inlier point may be a point which is not an outlier point. By moving an outlier point to an inlier point, duplicate points are generated. A duplicate point may refer to two points at the same position.

According to some embodiments, to avoid the generation of duplicate points, the current point p is moved toward the median point along the ray connecting p and the median, where the amount of movement is controlled by $0 \le \alpha \le 1$:

$$p \rightarrow \alpha * p + (1 - \alpha) * \arg\min_{x \in ne(p)} \sum_{y \in ne(x)} \|x - y\|,\qquad \text{Eq. 3}$$

where the expression on the left side of the +sign is the output of the first iteration, and the expression on the right side of the +sign is the output of the second iteration. The value of $\alpha$ may be fixed, or changed for each iteration. The value $\alpha$ may be signaled. When a different $\alpha$ is used for each iteration, and $\alpha$ is signaled, an array of $\alpha$ values may be signaled, where each index in the array represents a different iteration.

Figure 4B:
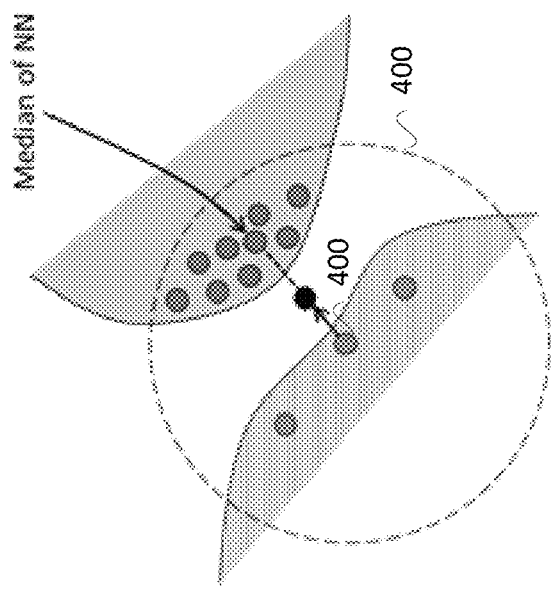
FIGS. 4A and 4B show moving a current point towards a nearest neighbor in accordance with embodiments of the present disclosure.
Figure 4A:
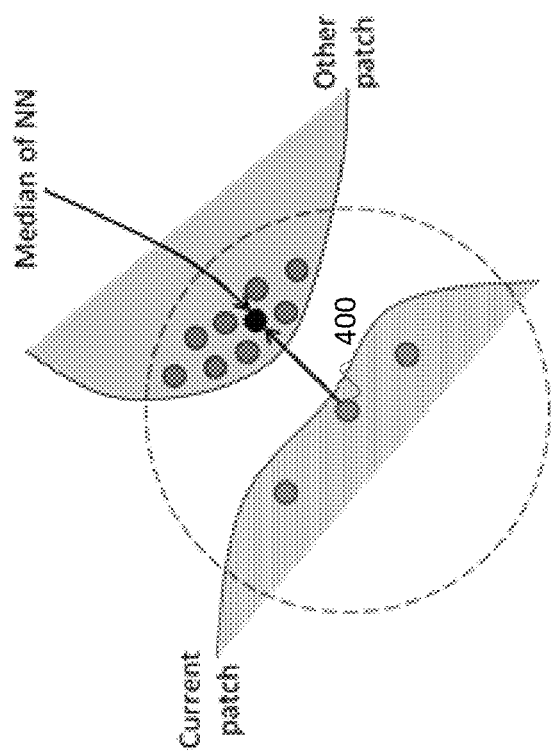
Figure 5B:
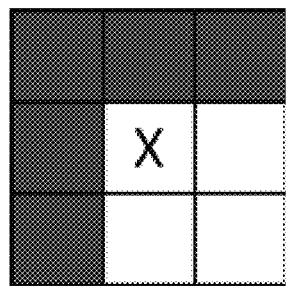
FIGS. 5A-5D show exemplary occupied corner points in accordance with embodiments of the present disclosure.
Figure 5D:
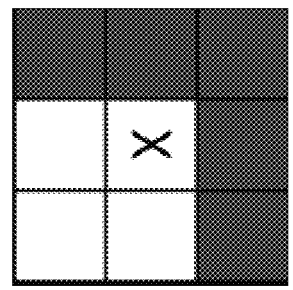
Figure 5A:
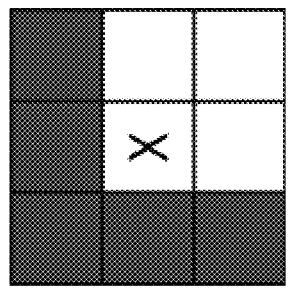
Figure 5C:
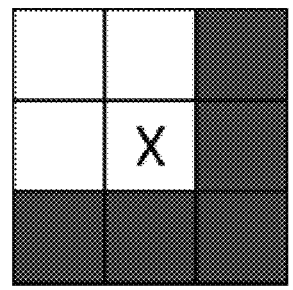
Figure 6B:
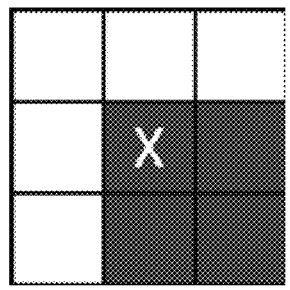
FIGS. 6A-6D show exemplary unoccupied corner points in accordance with embodiments of the present disclosure.
Figure 6D:
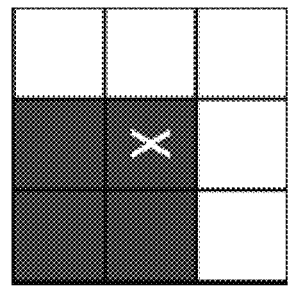
Figure 6A:
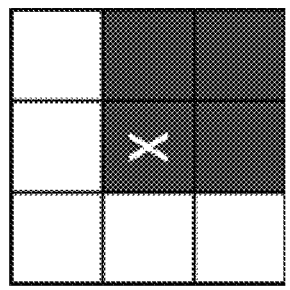
Figure 6C:
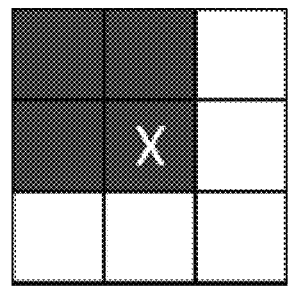

In FIGS. 4A and 4B, the dashed circle represents a sphere around a current point 400. In FIG. 4A, a median of a set of nearest neighbors (NN) is depicted in a dark black circle. If the current point 400 is moved to the median point, as illustrated in FIG. 4A, a duplicate of the current point 400 is generated. In FIG. 4B, to avoid generating duplicate points, the current point 400 is moved to a point along a ray connecting the current point 400 with the median point. The amount the current point 400 is moved may be determined based on the value of $\alpha$. For example, in FIG. 4A, $\alpha=0$, and in FIG. 4B, $\alpha=0.5$.

According to some embodiments, a patch-weighted average filter is used in one or more iterations. In a patch-weighted average filter, the set of neighboring points with the same patch index i may have an identical weight. In this regard, neighboring points in the same patch are weighted equally. However, different patches may be weighted differently. In Eq. 4 (below) $n_i$ denotes a number of neighboring points with patch index i. In Eq. 4, the weight proportional to $n_i$ is set, and the current point p is moved as follows:

$$p \rightarrow \frac{\sum_{\{i | ne(p) \text{ has at least one point with patch index } i\}} n_i \sum_{j=1}^{j=n_i} p(i, j)}{\sum_i n_i^2},\qquad \text{Eq. 4}$$

where p(i,j) denotes the j-th point among the set of neighboring points whose patch index is equal to i.

According to some embodiments, the types of the smoothing filters utilized in each iteration can be either signaled to or inferred by the decoder so that the decoder is able to reconstruct the exact same geometry as reconstructed at the encoder before the color transfer. The encoder/decoder may infer a filter based on the number of neighbors surrounding a current point. For example, if the number of neighbors is larger than a threshold, a median filter is used, otherwise, the average filter is used. Another example is for the encoder/decoder to compute statistics using the neighbors, and make a decision on the filter type based on comparing the computed statistics to a threshold. One example for computing the statistics includes measuring a local density of points, which can be calculated by taking the average of all neighbor-to-neighbor distances. If the average is small or large, the local density is inferred as high or low, respectively.

According to some embodiments, a smoothing filter is applied once on a current point, where the type of the smoothing filter may be selected among a set of available smoothing filters. Table 1 (reproduced below), illustrates example smoothing filters along with a corresponding type index. Embodiments of the present disclosure are not limited to the filters illustrated in Table 1.

TABLE 1

| Smoothing filter type | smoothing_filter_type_index[i] |
| --- | --- |
| Average filter | 0 |
| Vector median filter | 1 |
| Modified vector median filter | 2 |
| Patch-weighted average filter | 3 |

In some embodiments, the type of smoothing filter is signaled using, for example, the smoothing_filter_type_index. In other embodiments, the type of the smoothing filter can be inferred based upon the local statistics of the current point being smoothed. For example, local statistics of the current point such as median, average, and variance in accordance with one or more predetermined thresholds may be used to determine the filter type. For example, if a median of the current point and surrounding neighboring points is below a predetermined threshold, or between two different thresholds, one of the filters illustrated in Table 1 may be selected.

According to some embodiments, the encoder signals the thresholds to define multiple intervals of the chosen local statistical value. The encoder may also signal the indexes of different types of smoothing filters that will be used for those intervals. The decoder may infer the type of the filter by calculating a value ($\mu$) (e.g., average, median, variance, etc.) representative of the local statistics of a current point and finding the matching interval based upon For example, (i) when $0 \leq \mu \leq 0.25$, the average filter is selected, (ii) when $0.25 \leq \mu \leq 0.5$, the vector median filter is selected, (iii) when $0.5 \leq \mu \leq 0.75$, the modified vector median filter is selected, and (iv) when $0.75 \leq \mu \leq 1.0$, the patch-weighted average filter is selected.

This procedure is performed in the same manner at both at the encoder and decoder to avoid mismatches. Although one iteration of smoothing is applied, adaptive smoothing is being performed since various filters are applied in accordance with computed local statistics.

In some embodiments, the encoder explicitly signals the type of smoothing filter for each processing unit of choice such as a GOP (Group Of Pictures), Slice/Tile, CU/TU, or pixel. Although one iteration of smoothing is applied, adaptive smoothing is being performed since various filters are applied locally.

The following tables illustrate example processes for performing iterative and non-iterative smoothing in accordance with the above-disclosed embodiments. Table 2 illustrates an example process for performing iterative smoothing.

TABLE 2

|  | Descriptor |
|---|---|
| iterative_smoothing_metadata( ) {<br>    if(iterative_smoothing_enabled_flag) {<br>        iterative_smoothing_present_flag<br>        if(iterative_smoothing_present_flag) {<br>    number_of_iterations<br>        for(i = 0; i < number of iterations; ++i) {<br>            smoothing_filter_type_index_per_iteration[ i ]<br>        }<br>    }<br>} | <br><br>u(1)<br><br>u(8)<br><br>u(8) |

Table 3 illustrates an example process for performing non-iterative adaptive smoothing with inferred filter-types.

TABLE 3

|  | Descriptor |
|---|---|
| non_iterative_adaptive_smoothing_metadata( ) {<br>    if(non_iterative_adaptive_smoothing_enabled_flag) {<br>        non_iterative_adaptive_smoothing_with_inferred<br>_filter_types_present_flag<br>        if(non_iterative_adaptive_smoothing_with_inferred_filter_types_present_flag) {<br>    number_of_statistic_thresholds<br>        for(i = 1; i <= number_of_statistic_thresholds; ++i) {<br>            statistic_threshold[ i ]<br>        }<br>        for(i = 0; i <= number_of_statistic_thresholds; ++i) {<br>            smoothing_filter_type_index_per_statistic_range[ i ]<br>        }<br>    }<br>} | <br><br>u(1)<br><br><br>u(8)<br><br>d(64)<br><br><br>u(8) |

Table 4 illustrates an example process for performing non-iterative adaptive smoothing with filter-type signaling.

TABLE 4

|  | Descriptor |
|---|---|
| non_iterative_adaptive_smoothing_metadata( ) {<br>    if(non_iterative_adaptive_smoothing_enabled_flag) {<br>        non_titerative_adaptive_smoothing_with_filter_type_signaling_present_flag<br>        if(non_iterative_adaptive_smoothing_with_filter_type_signaling_present_flag) {<br>            for(i = 0; i < number_of_points; ++i) {<br>                smoothing_filter_type_index_per_point[ i ]<br>            }<br>        }<br>    }<br>} | <br><br>u(1)<br><br><br>u(8) |

The following descriptions provide embodiments of the variables used in the above-disclosed tables.

iterative_smoothing_present_flag indicates whether iterative smoothing is used or not.

number_of_iterations indicates a number of times the smoothing process is applied sequentially.

smoothing_filter_type_index_per_iteration[i] indicates an index of the type of the smoothing filter used in the i-th iteration. The value of smoothing_filter_type_index_per_iteration[i] shall be in the range [0, number_of_available_smoothing_filter_types−1]. Table 1 shows an exemplary set of filter types and their corresponding indexes, where number_of_available_smoothing_filter_types equals to 4.

non_iterative_adaptive_smoothing_with_inferred_filter_types_present_flag indicates whether non-iterative adaptive smoothing with inferred filter types is used or not.

number_of_statistic_thresholds indicates the number of thresholds used to define the statistic ranges. The value of number_of_statistic_thresholds may be in the range [0, 255].

statistic_thresholds[i] indicates the values of statistic thresholds that specify the non-overlapping statistic ranges. The value of statistic_threshold[i] may be in the range [$-2^{32}$, $-2^{32}$].

smoothing_filter_type_index_per_statistic_range[i] indicates the index of the type of the smoothing filter applied when the computed statistic is located within the range [statistic_threshold[i], statistic_threshold[i+1]), where statistic_threshold[0]=−∞ and statistic_threshold[number_of_statistic_thresholds]=+∞. The value of smoothing_filter_type_index_per_iteration[i] may be in the range [0, number_of_available_smoothing_filter_types−1]. Table 1 shows an exemplary set of filter types and their corresponding indexes, where number_of_available_smoothing_filter_types equals to 4.

non_iterative_adaptive_smoothing_with_filter_type_signaling_present_flag indicates whether non-iterative adaptive smoothing with filter type signaling is used or not.

smoothing_filter_type_index_per_point[i] indicates the index of the type of the smoothing filter applied for the i-th point. The value of smoothing_filter_type_per_point[i] may be in the range [0, number_of_available_smoothing_filter_types−1]. Table 1 shows an exemplary set of filter types and their corresponding indexes, where number_of_available_smoothing_filter_types equals to 4.

According to some embodiments, for a decoding process for iterative smoothing, the inputs are indexes of types of smoothing filters used at each smoothing iteration. When the metadata smoothing_filter_type index_per_iteration[i] is decoded, the decoder sequentially applies the smoothing filters, where at iteration i, the decoder applies the smoothing filter, having an index with the value of smoothing_filter_type_index_per_iteration[i], on the smoothed output obtained at iteration (i−1).

According to some embodiments, for a decoding process for non-iterative adaptive smoothing with inferred filter-types, the inputs are (i) statistic thresholds that specify a set of non-overlapping ranges, and (ii) a set of filter type indexes that specify the filter type applied at each of these non-overlapping ranges. For the current point, the decoder may first compute a statistic based on a local neighborhood of the current point. Using the decoded threshold values, the entire range of real axis may be split into (number_of_statistic_thresholds+1) non-overlapping ranges. If the computed statistic is located within the i-th range, the smoothing filter with index smoothing_filter_type_per_statistic_range[i] is applied to the current point.

According to some embodiments, for a decoding process for non-iterative adaptive smoothing with filter-type signaling, the inputs are the indexes of smoothing filter types per point. When the smoothing_filter_type_index_per_point[i] is decoded for the current point, the decoder may apply a smoothing filter having an index with the value of smoothing_filter_type_index_per_point[i].

As discussed above, the goal of geometry smoothing is to recover the geometry distorted at patch boundaries, which is due to geometry compression as well as conversion of a high-resolution occupancy map to a lower-resolution one. Embodiments of the present disclosure apply an adaptive erosion scheme on a compressed 2D occupancy map, which provides the significant advantageous features of low computational complexity compared to the highly complex geometry smoothing in the 3D domain, as well as an improved geometry-reconstructed cloud, which in turn leads to a higher-quality compressed texture-video.

According to some embodiments, an adaptive erosion filter is applied on the reconstructed occupancy map. In this regard, geometry smoothing is performed in the 2D domain rather than 3D domain. Any additional geometry smoothing in the 3D domain may still be applied in conjunction with the geometry smoothing performed in the 2D domain.

At the decoder, in some examples, only a decoded low-resolution occupancy map is available, where a high-resolution occupancy map is reconstructed from the low-resolution occupancy map. Embodiments of the present disclosure perform an adaptive erosion scheme on the reconstructed high-resolution occupancy map to recover the original high-resolution occupancy map. Each pixel of the decoded low-resolution occupancy map may correspond to an N×N block of pixels of the reconstructed high-resolution occupancy map, where N may be an arbitrary integer number that is specified by a user or predetermined by the decoder.

In some embodiments, an occupied (unoccupied) pixel of the low-resolution occupancy map corresponds to a fully occupied (unoccupied) N×N block of pixels of the reconstructed high-resolution occupancy map. Dilation does not need to be performed since the set of occupied pixels of the uncompressed high-resolution occupancy map is always a subset of the occupied pixels of the reconstructed high-resolution occupancy map.

In some embodiments, an adaptive erosion filter is applied to the reconstructed high-resolution occupancy map. In some examples, pattern matching is not performed on the decoded low-resolution occupancy map and all the processing is done on the reconstructed high-resolution occupancy map based on the local neighborhood of reconstructed occupied/unoccupied pixels.

In some embodiments, the adaptive erosion filter first locates the occupied/unoccupied corner points (pixels) and occupied vertical/horizontal borders (e.g., a border could be either vertical or horizontal with a non-fixed length) in the high-resolution occupancy map. After these points and borders are located, the adaptive erosion filter applies different erosion patterns at a neighborhood of these corner-points/borders. In this regard, erosion is done at the neighborhood corner points and borders.

In some embodiments, an occupied corner point (pixel) is an occupied pixel that includes X unoccupied neighboring pixels and Y occupied neighboring pixels, with X>Y. For example, X=5 unoccupied pixels and Y=3 occupied pixels. FIGS. 5A-5D illustrate example occupied corner points, where the occupied and unoccupied pixels are represented in white and black, respectively, and the occupied corner point is denoted by a cross.

In some embodiments, an unoccupied corner point (pixel) is an unoccupied pixel that has Y occupied neighboring pixels and X unoccupied neighboring pixels, with Y>X. For example, Y=5 occupied pixels and X=3 unoccupied pixels. FIGS. 6A-6D illustrate example unoccupied corner points, where the occupied and unoccupied pixels are represented in white and black, respectively, and the unoccupied corner point is denoted by a cross.

Figure 7B:
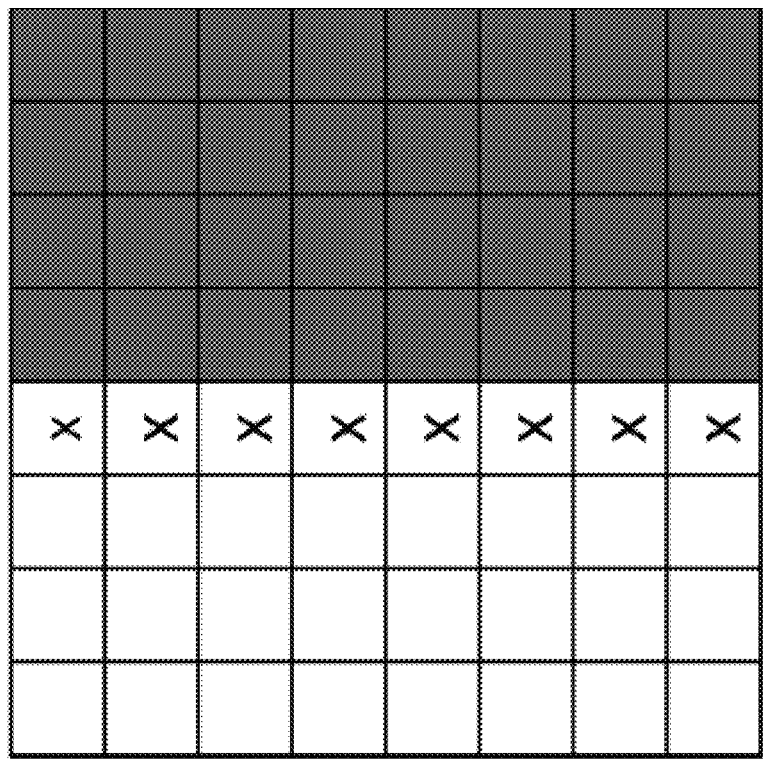
FIGS. 7A and 7B show exemplary occupied vertical borders in accordance with embodiments of the present disclosure.
Figure 7A:
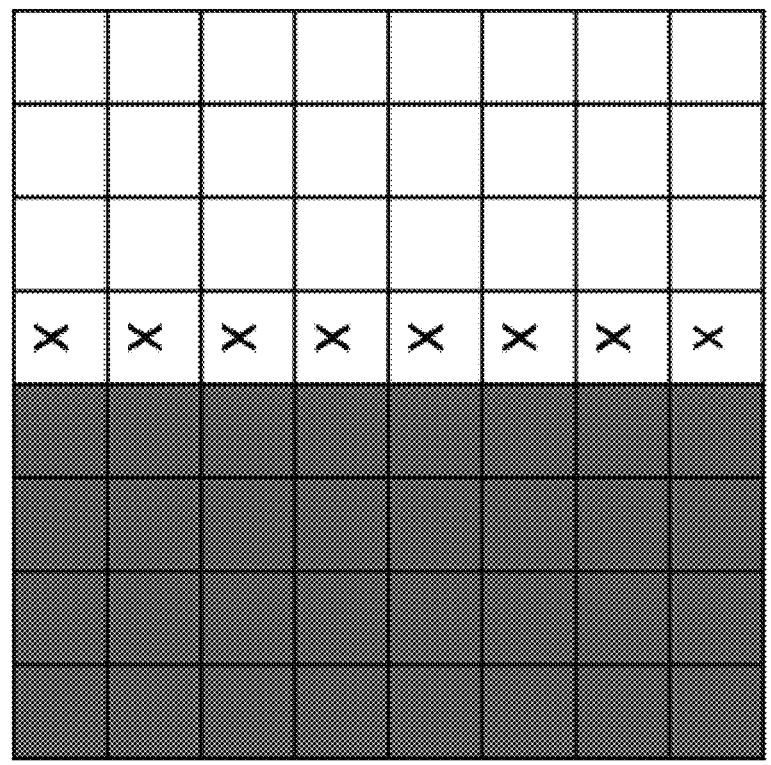

In some embodiments, an occupied vertical border is a vertical border that includes $L_1 \times N$ ($2 \leq L_1$) occupied pixels arranged vertically with no gap in between (see e.g., min_border_lenght_vertical in Table 5). There may be two types of vertical borders: (i) a vertical border with all left neighbors being unoccupied (FIG. 7A), and (ii) a vertical border with all right neighbors being unoccupied (FIG. 7B).

Figure 8B:
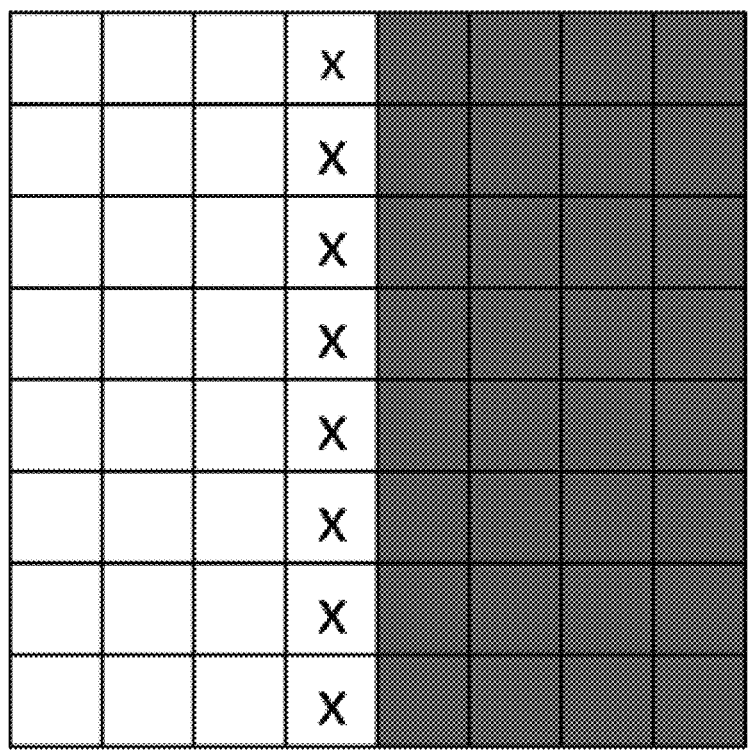
FIGS. 8A and 8B show exemplary occupied horizontal borders in accordance with embodiments of the present disclosure.
Figure 8A:
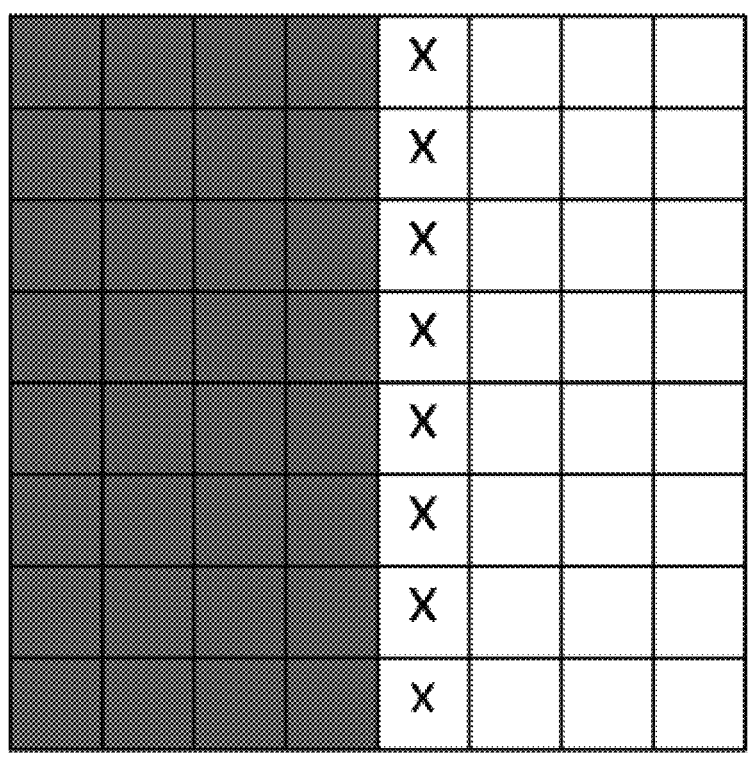
Figure 9B:
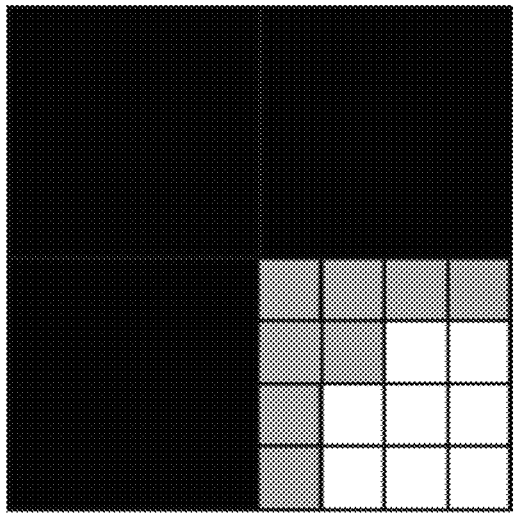
FIGS. 9A-9D show an exemplary adaptive erosion filter applied to the occupied corner points in accordance with embodiments of the present disclosure.
Figure 9D:
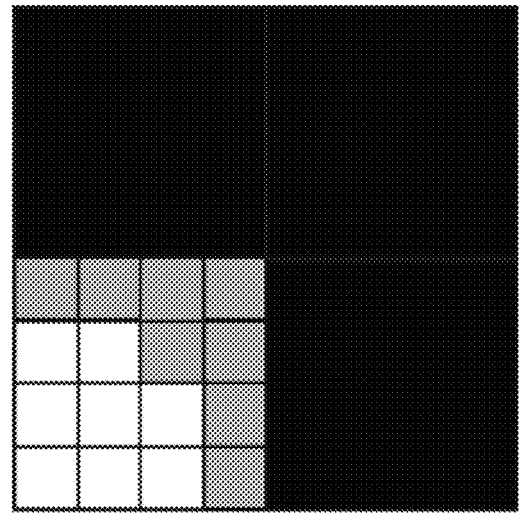
Figure 9A:
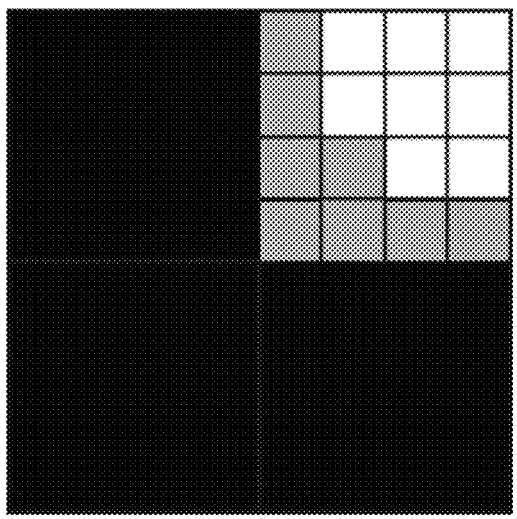
Figure 9C:
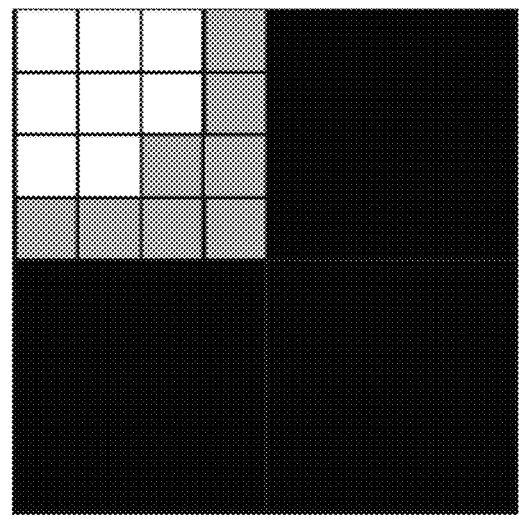
Figure 10A:
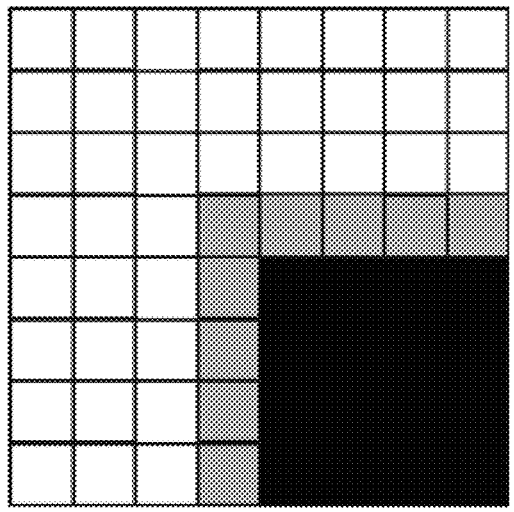
FIGS. 10A-10D show an exemplary adaptive erosion filter applied to the unoccupied corner points in accordance with embodiments of the present disclosure.
Figure 10B:
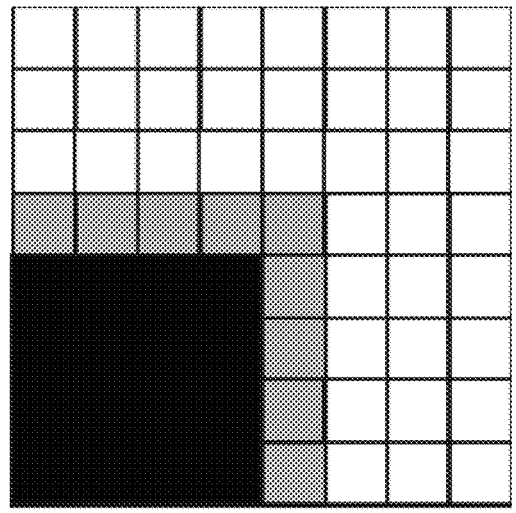
Figure 10C:
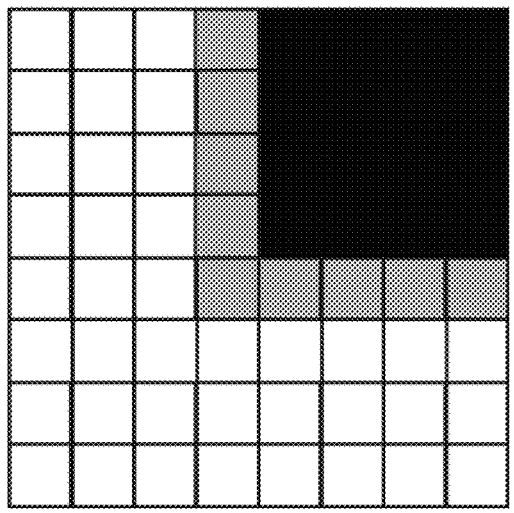
Figure 10D:
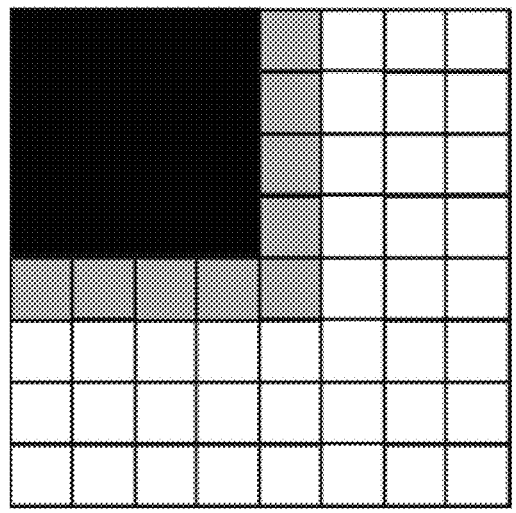

In some embodiments, an occupied horizontal border includes a horizontal border that includes $L_2 \times N$ ($2 \leq L_2$) occupied pixels arranged horizontally with no gap in between (see e.g., min_border_lenght_horizontal in Table 5). There may be two types of horizontal borders: (i) a horizontal border having all top neighbors being unoccupied (FIG. 8A), and (ii) a horizontal border having all bottom neighbors being unoccupied (FIG. 8B).

According to some embodiments, after the above-disclosed candidate points/borders are determined, one or more erosion patterns may be applied at the candidate's neighborhood, where the erosion may include the point/border itself. The erosion patterns may be scaled to different block sizes.

According to some embodiments, erosion patterns are applied to a block size of 4×4 (i.e., N=4) for occupied/unoccupied corner points and occupied vertical/horizontal borders. In other embodiments, scaled versions of these erosion patterns may be applied for a block size 2×2 (i.e., N=2). $L_1$ and $L_2$ may be set to 2.

FIGS. 9A-9D show erosion patterns for all the four types of occupied corner points. White and black pixels denote occupied and unoccupied pixels, respectively. Furthermore, gray pixels denote eroded pixels, which may be pixels that used to be occupied but set as unoccupied as a result of the adaptive erosion filter. The embodiments of the present disclosure are not limited to the erosion patterns illustrated in FIGS. 9A-9D, where other erosion patterns could be adopted to erode more/less pixels, which, respectively, correspond to heavier/lighter smoothing. FIGS. 10A-10D show erosion patterns for all four types of unoccupied corner points.

Figure 11B:
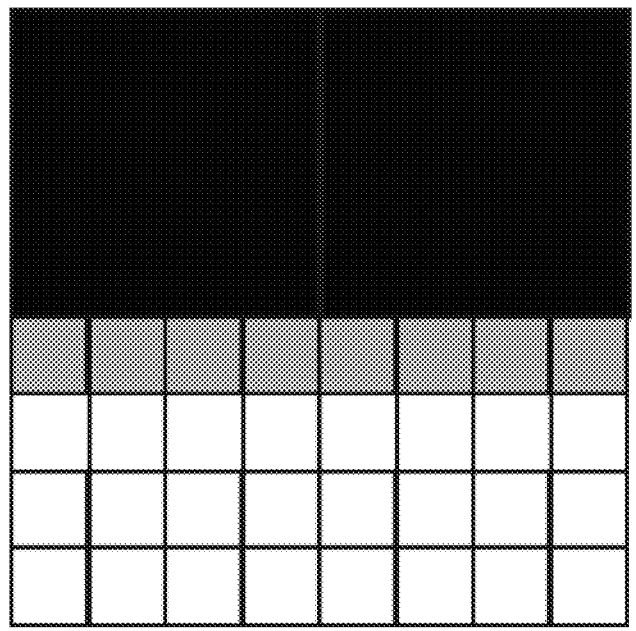
FIGS. 11A and 11B show an exemplary adaptive erosion filter applied to the vertical borders in accordance with embodiments of the present disclosure.
Figure 11A:
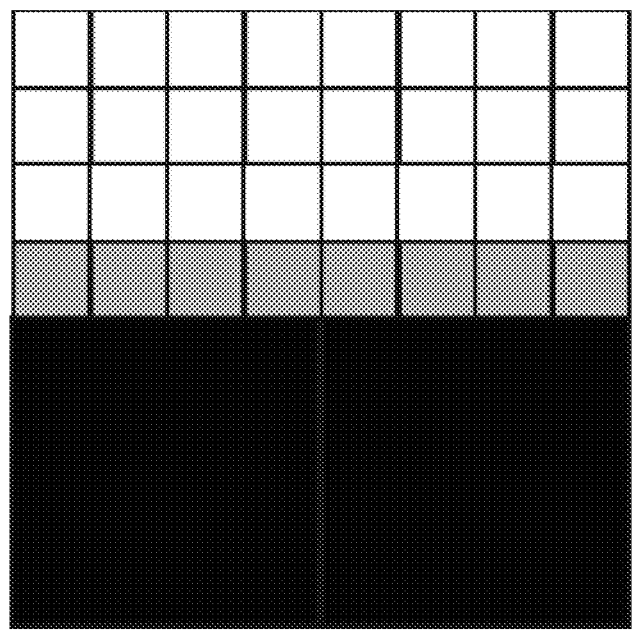
Figure 12B:
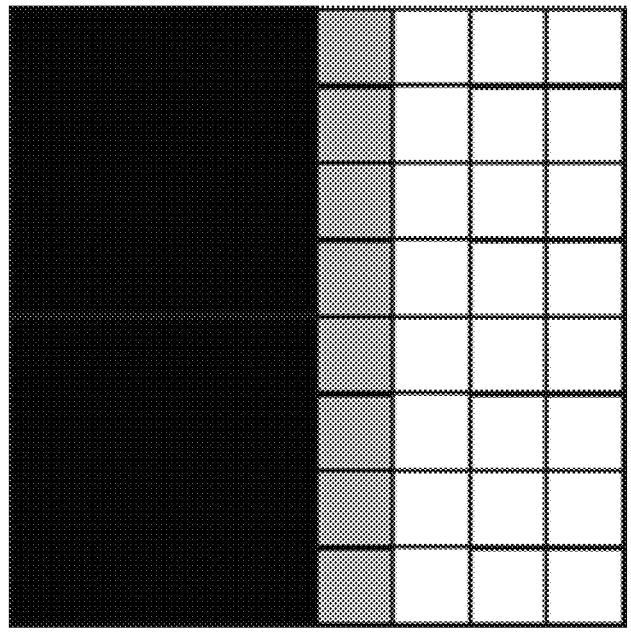
FIGS. 12A and 12B show an exemplary adaptive erosion filter applied to the horizontal borders in accordance with embodiments of the present disclosure.
Figure 12A:
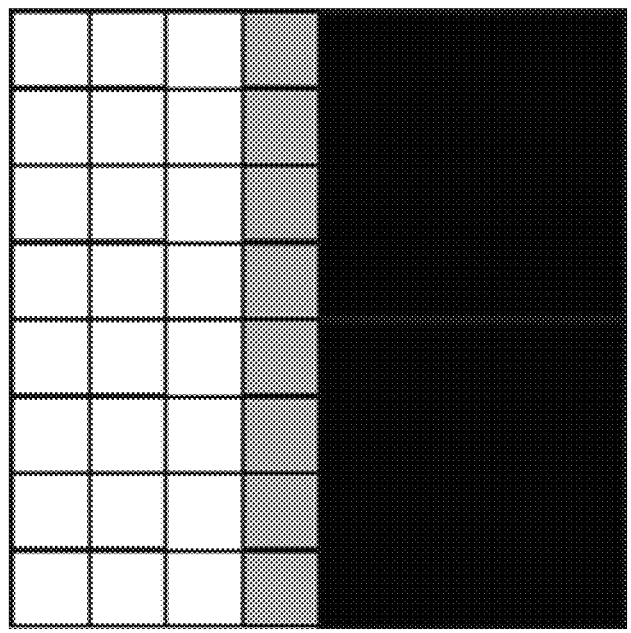
Figure 14A:
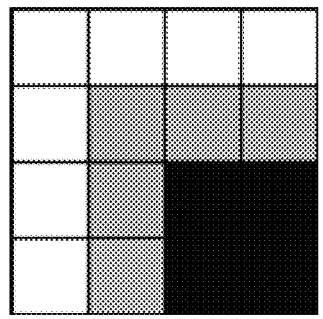
FIGS. 14A-14D show an exemplary adaptive erosion filter applied to the unoccupied corner points in accordance with embodiments of the present disclosure.
Figure 14C:
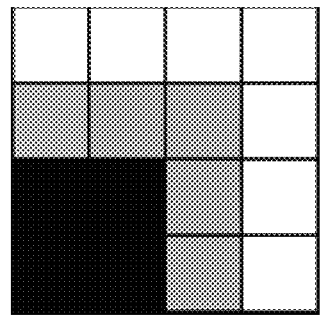
Figure 14B:
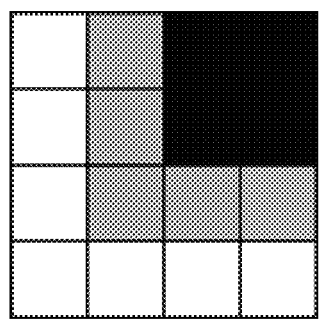
Figure 14D:
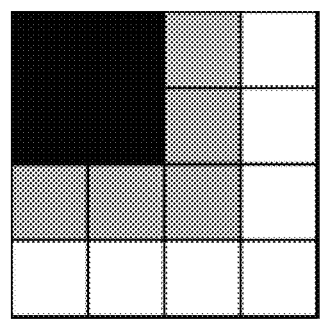

FIGS. 11A and 11B show the erosion patterns for both types of occupied vertical borders. For example, one column of pixels is eroded. A larger number of pixels (see e.g., border_erosion_thickness_vertical in Table 5) could be eroded for heavier smoothing. FIGS. 12A and 12B show the erosion patterns for both types of occupied horizontal border. As illustrated in FIGS. 12A and 12B, one row of pixels is eroded. However, a larger number of pixels (see e.g., border_erosion_thickness_horizontal in Table 5) could be eroded for heavier smoothing.

According to some embodiments, a scaled version of the above-disclosed erosion patterns may be performed for a block size of 2×2 (i.e., N=2), where $L_1$ and $L_2$ may be set to 2. According to embodiments of the present disclosure, the definition of occupied/unoccupied corner points and vertical/horizontal borders is independent of the block size. For example, regardless of block size, a corner point may be defined by the corner point's 8 neighbors, and the vertical/horizontal borders may be defined by $L_1$ and $L_2$, which are set independently from the block size.

FIGS. 13A-13D shows the erosion patterns for all four types of occupied corner points. As in the other examples, the white and black pixels denote occupied and unoccupied pixels, respectively. Furthermore, the gray pixels denote eroded pixels, which may be pixels that used to be occupied, but are now set as unoccupied in accordance with the adaptive erosion filter. As discussed above, the embodiments of the present disclosure are not limited to the erosion patterns illustrated in FIGS. 13A-13D, where other erosion patterns could be adopted to erode more/less pixels, which, respectively, correspond to heavier/lighter smoothing. FIGS. 14A-14D show the erosion patterns for all four types of unoccupied corner points.

Figure 15B:
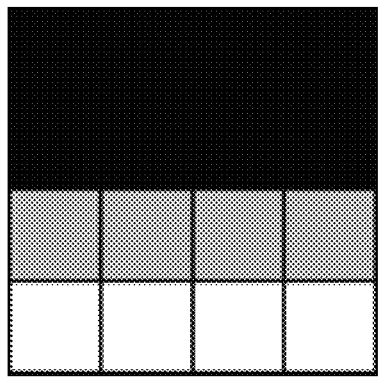
FIGS. 15A and 15B show an exemplary adaptive erosion filter applied to the vertical borders in accordance with embodiments of the present disclosure.
Figure 15A:
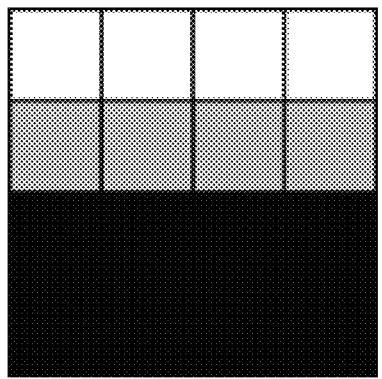
Figure 16B:
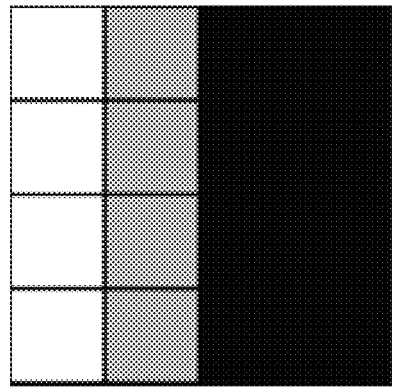
FIGS. 16A and 16B show an exemplary adaptive erosion filter applied to the horizontal borders in accordance with embodiments of the present disclosure.
Figure 16A:
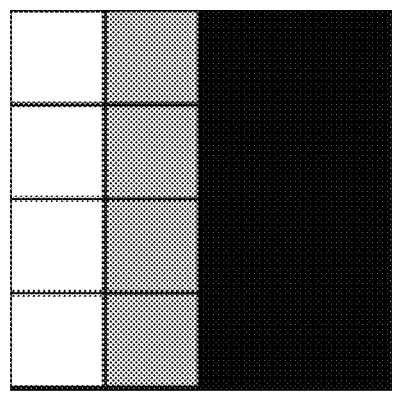

FIGS. 15A and 15B show the erosion patterns for both types of occupied vertical borders. Here, one column of pixels is eroded. However, a larger number of columns of pixels (see e.g., border_erosion_thickness_vertical in Table 5) could be eroded for heavier smoothing. FIGS. 16A and 16B show the erosion patterns for both types of occupied horizontal border. As illustrated in FIGS. 16A and 16B, one row of pixels is eroded. However, a larger number of pixels (see e.g., border_erosion_thickness_horizontal in Table 5) could be eroded for heavier smoothing.

Table 5 (below) illustrates an example process for performing adaptive erosion filtering.

TABLE 5

|  | Descriptor |
|---|---|
| adaptive_erosion_smoothing_metadata( ) { | |
|     if(adaptive_erosion_smoothing_enabled_flag) { | |
|         adaptive_erosion_smoothing_present_flag | u(1) |
|         if(adaptive_erosion_smoothing_present_flag) { | |
|             min_border_length_horizontal | u(8) |
|             min_border_length_vertical | u(8) |
|             border_erosion_thickness_horizontal | u(8) |
|             border_erosion_thickness_vertical | u(8) |
|             for(y = 0; y < block_size; ++y) { | |
|                 for(x = 0; x < block size; ++x) { | |
|                     occupied_corner_erosion_pattern[y][x] | u(1) |
|                 } | |
|             } | |

TABLE 5-continued

| | Descriptor |
|---|---|
| `for(y = 0; y < block_size; ++y) {` | |
| `  for(x = 0; x < block_size; ++x) {` | |
| `    unoccupied_corner_erosion_pattern_0[y][x]` | u(1) |
| `    unoccupied_corner_erosion_pattern_1[y][x]` | u(1) |
| `    unoccupied_corner_erosion_pattern_2[y][x]` | u(1) |
| `  }` | |
| `}` | |
| `}` | |

The following descriptions provide embodiments of the variables used in Table 5.

adaptive_erosion_smoothing_present_flag indicates whether adaptive erosion smoothing is used or not.

min_border_length_horizontal indicates the minimum number of occupied horizontally arranged consecutive blocks to be considered as an occupied horizontal border. The value of min_border_length_horizontal may be in the range of 2 to $2^8-1$, inclusive.

min_border_length_vertical indicates the minimum number of occupied vertically arranged consecutive blocks to be considered as an occupied vertical border. The value of min_border_length_vertical may be in range of 2 to $2^8-1$, inclusive.

border_erosion_thickness_horizontal indicates the number of rows eroded for the case of an occupied horizontal border. The value of border_erosion_thickness_horizontal may be in the range [0, block_size]. For borders having a width of one block, the maximum value of border_erosion_thickness_horizontal is block size/2.

border_erosion_thickness_vertical indicates the number of columns eroded for the case of an occupied vertical border. The value of border_erosion_thickness_vertical may be in the range [0, block_size]. For borders having a width of one block, the maximum value of border_erosion_thickness_vertical will be block size/2.

occupied_corner_erosion_pattern determines the erosion pattern at the neighborhood of an occupied corner. All four erosion patterns can be obtained by 90-degree rotations of a single pattern (e.g., an example for N=4 is illustrated in FIGS. 9A-9D).

unoccupied_corner_erosion_pattern_[0,1,2] determine the erosion pattern in the neighborhood of an unoccupied corner. Erosion may be performed on three N×N blocks in the neighborhood of an unoccupied corner, which are denoted by indexes 0, 1, and 2. All four erosion patterns may be obtained by 90-degree rotations of a single pattern (e.g., an example for N=4 is illustrated in FIGS. 10A-10D).

Figure 17:
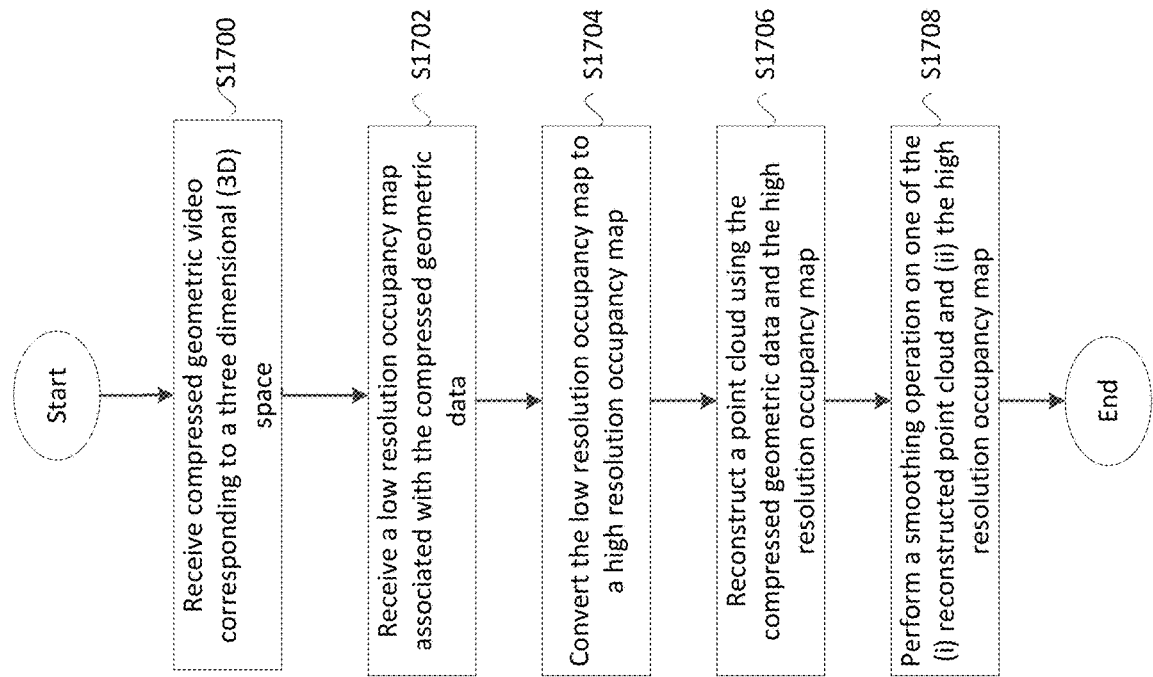
FIG. 17 illustrates an exemplary process performed by a decoder in accordance with an embodiment of the present disclosure.

FIG. 17 illustrates an embodiment of a process that may be performed by a decoder. The process illustrated in FIG. 17 may start at step S1700 where a compressed geometric video corresponding to a 3D space is received. The process proceeds to step S1702 where a low resolution occupancy map associated with the compressed geometric data is received.

The process proceeds to step S1704 where the low resolution occupancy map is converted to a high resolution occupancy map. The process proceeds to step S1706 where a point cloud is reconstructed using the compressed geometric data and the high resolution occupancy map. The process proceeds to step S1708 where a smoothing operation is performed on one of the (i) reconstructed point cloud and (ii) the high resolution occupancy map. If the smoothing operation is performed on the reconstructed point cloud, any one of the smoothing processes illustrated in Tables 2-4 may be performed on the reconstructed point cloud. If the smoothing operation is performed on the high resolution occupancy map, the adaptive erosion smoothing process illustrated in Table 5 may be performed on the high resolution occupancy map.

The techniques described above, can be implemented as computer software using computer-readable instructions and physically stored in one or more computer-readable media. For example, FIG. 18 shows a computer system (1800) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 18:
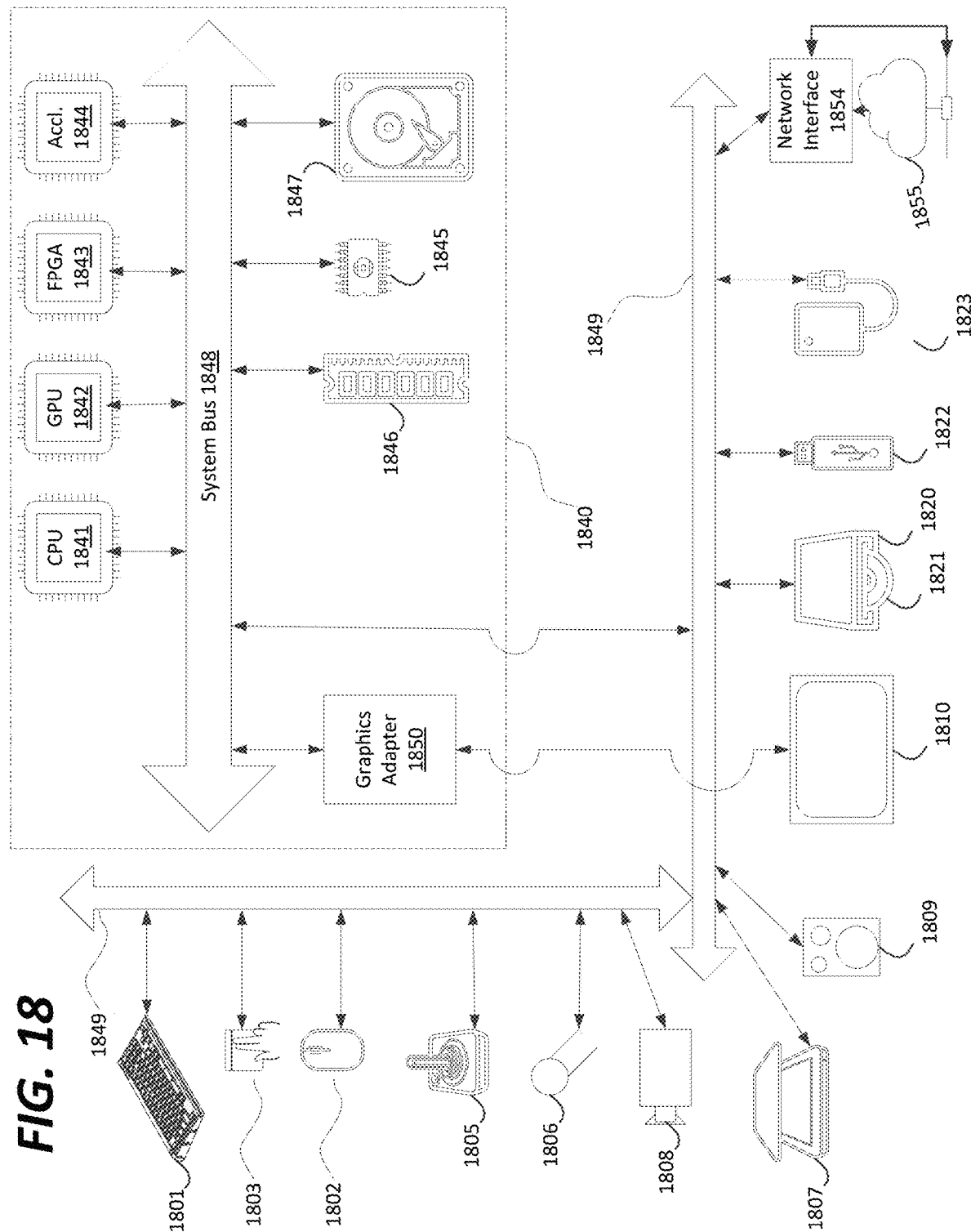
FIG. 18 is a schematic illustration of a computer system in accordance with an embodiment.

The components shown in FIG. 18 for computer system (1800) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1800).

Computer system (1800) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1801), mouse (1802), trackpad (1803), touch screen (1810), data-glove (not shown), joystick (1805), microphone (1806), scanner (1807), camera (1808).

Computer system (1800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1810), data-glove (not shown), or joystick (1805), but there can also be tactile feedback devices that do not serve as input devices), audio output devices (such as: speakers (1809), headphones (not depicted)), visual output devices (such as screens (1810) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1800) can also include human accessible storage devices and their associated media such as optical media including CD/DVD ROM/RW (1820) with CD/DVD or the like media (1821), thumb-drive (1822), removable hard drive or solid state drive (1823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1800) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1849) (such as, for example USB ports of the computer system (1800)); others are commonly integrated into the core of the computer system (1800) by attachment to a system bus as described below (for example Ethernet interface into a PC computer system or cellular network interface into a smartphone computer system). Using any of these networks, computer system (1800) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1840) of the computer system (1800).

The core (1840) can include one or more Central Processing Units (CPU) (1841), Graphics Processing Units (GPU) (1842), specialized programmable processing units in the form of Field Programmable Gate Areas (FPGA) (1843), hardware accelerators for certain tasks (1844), and so forth. These devices, along with Read-only memory (ROM) (1845), Random-access memory (1846), internal mass storage such as internal non-user accessible hard drives, SSDs, and the like (1847), may be connected through a system bus (1848). In some computer systems, the system bus (1848) can be accessible in the form of one or more physical plugs to enable extensions by additional CPUs, GPU, and the like. The peripheral devices can be attached either directly to the core's system bus (1848), or through a peripheral bus (1849). Architectures for a peripheral bus include PCI, USB, and the like.

CPUs (1841), GPUs (1842), FPGAs (1843), and accelerators (1844) can execute certain instructions that, in combination, can make up the aforementioned computer code. That computer code can be stored in ROM (1845) or RAM (1846). Transitional data can be also stored in RAM (1846), whereas permanent data can be stored for example, in the internal mass storage (1847). Fast storage and retrieve to any of the memory devices can be enabled through the use of cache memory, that can be closely associated with one or more CPU (1841), GPU (1842), mass storage (1847), ROM (1845), RAM (1846), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1800), and specifically the core (1840) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1840) that are of non-transitory nature, such as core-internal mass storage (1847) or ROM (1845). The software implementing various embodiments of the present disclosure can be stored in such devices and executed by core (1840). A computer-readable medium can include one or more memory devices or chips, according to particular needs. The software can cause the core (1840) and specifically the processors therein (including CPU, GPU, FPGA, and the like) to execute particular processes or particular parts of particular processes described herein, including defining data structures stored in RAM (1846) and modifying such data structures according to the processes defined by the software. In addition or as an alternative, the computer system can provide functionality as a result of logic hardwired or otherwise embodied in a circuit (for example: accelerator (1844)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

(1) A method of video decoding performed in a video decoder, the method including receiving compressed geometric data corresponding to a three dimensional (3D)

space; receiving a low resolution occupancy map associated with the data cloud; converting the low resolution occupancy map to a high resolution occupancy map; reconstructing a point cloud using the compressed geometric data and the high resolution occupancy map; and performing a smoothing operation on one of the (i) reconstructed point cloud and (ii) the high resolution occupancy map.

(2) The method according to feature (1), in which the smoothing operation includes a plurality of iterations of one or more smoothing filters applied to the reconstructed point cloud.

(3) The method according to feature (2), in which the plurality of iterations of the one or more smoothing filters includes a same smoothing filter being applied in each of the plurality of iterations.

(4) The method according to feature (2), in which the plurality of iterations of the one or more smoothing filters includes at least two different filters being applied to the reconstructed point cloud.

(5) The method according to feature (2), in which the plurality of iterations of the one or more smoothing filters includes a median smoothing filter that moves a current point in the reconstructed point cloud towards a vector median of a set of points neighboring the current point, in which the amount of movement towards the vector median is in accordance with a threshold (a) that is greater than 0 and less than or equal to 1, and in which the current point is moved to the vector median when $\alpha=1$.

(6) The method according to feature (2), in which the plurality of iterations of the one or more smoothing filters includes an average smoothing filter that moves a current point in the reconstructed point cloud to a centroid of a set of points neighboring the current point.

(7) The method according to feature (2), in which the plurality of iterations of the one or more smoothing filters includes a patch weighted average filter that moves a current point in the reconstructed point cloud to a centroid of a set of points neighboring the current point, and in which the reconstructed point cloud is surrounded by a plurality of points belonging to different patches each having a respective weight, and in which each point in the set of points belonging to a same patch is equally weighted.

(8) The method according to any one of features (1)-(7), in which the smoothing operation is a smoothing filter applied to the reconstructed point cloud, and in which the smoothing filter is selected from a plurality of smoothing filters.

(9) The method according to feature (8), in which the selection of the smoothing filter is signaled with the compressed geometric data.

(10) The method according to feature (8), in which the smoothing filter is selected based on a comparison of a statistical computation performed on the point cloud with one or more predetermined thresholds.

(11) The method according to feature (1), in which the smoothing operation includes an adaptive erosion filter applied to the high resolution occupancy map.

(12) The method according to feature (11), in which the adaptive erosion filter erodes one or more pixels located at a boundary between a set of occupied pixels and a set of unoccupied pixels, and in which each eroded pixel corresponds to an occupied pixel that is changed to an unoccupied pixel.

(13) The method according to feature (12), in which the boundary is an occupied corner point in which the set of occupied pixels is an N×N block, and the set of unoccupied pixels surrounds two sides of the N×N block.

(14) The method according to feature (12), in which the boundary is an unoccupied corner point in which the set of unoccupied pixels is an N×N block, and the set of occupied pixels surrounds two sides of the N×N block.

(15) The method according to feature (12), in which the boundary is a vertical boundary between the set of occupied pixels and the set of unoccupied pixels.

(16) The method according to feature (12), in which the boundary is a horizontal boundary between the set of occupied pixels and the set of unoccupied pixels.

(17) A video decoder including processing circuitry configured to receive compressed geometric data corresponding to a three dimensional (3D) space, receive a low resolution occupancy map associated with the data cloud, convert the low resolution occupancy map to a high resolution occupancy map, reconstruct a point cloud using the compressed geometric data and the high resolution occupancy map, and perform a smoothing operation on one of the (i) reconstructed point cloud and (ii) the high resolution occupancy map.

(18) The video decoder according to feature (17), in which the smoothing operation includes a plurality of iterations of one or more smoothing filters applied to the reconstructed point cloud.

(19) The video decoder according to feature (17), in which the smoothing operation includes an adaptive erosion filter applied to the high resolution occupancy map.

(20) A non-transitory computer readable medium having instructions stored therein, which when executed by a processor in a video decoder, causes the processor to execute a method including receiving compressed geometric data corresponding to a three dimensional (3D) space; receiving a low resolution occupancy map associated with the data cloud; converting the low resolution occupancy map to a high resolution occupancy map; reconstructing a point cloud using the compressed geometric data and the high resolution occupancy map; and performing a smoothing operation on one of the (i) reconstructed point cloud and (ii) the high resolution occupancy map.

What is claimed is:

1. A method of video decoding performed in a video decoder, comprising:
   receiving compressed geometric data corresponding to a three dimensional (3D) space;
   receiving a low resolution occupancy map associated with a data cloud;
   converting the low resolution occupancy map to a high resolution occupancy map;
   reconstructing a point cloud using the compressed geometric data and the high resolution occupancy map; and
   performing a smoothing operation on one of the (i) reconstructed point cloud and (ii) the high resolution occupancy map.

2. The method according to claim 1,
   wherein the smoothing operation includes a plurality of iterations of one or more smoothing filters applied to the reconstructed point cloud.

3. The method according to claim 2,
   wherein the plurality of iterations of the one or more smoothing filters includes a same smoothing filter being applied in each of the plurality of iterations.

4. The method according to claim 2,
   wherein the plurality of iterations of the one or more smoothing filters includes at least two different filters being applied to the reconstructed point cloud.

5. The method according to claim 2,
wherein the plurality of iterations of the one or more smoothing filters includes a median smoothing filter that moves a current point in the reconstructed point cloud towards a vector median of a set of points neighboring the current point,
wherein an amount of movement towards the vector median is in accordance with a threshold ($\alpha$) that is greater than 0 and less than or equal to 1, and
wherein the current point is moved to the vector median when $\alpha=1$.

6. The method according to claim 2,
wherein the plurality of iterations of the one or more smoothing filters includes an average smoothing filter that moves a current point in the reconstructed point cloud to a centroid of a set of points neighboring the current point.

7. The method according to claim 2,
wherein the plurality of iterations of the one or more smoothing filters includes a patch weighted average filter that moves a current point in the reconstructed point cloud to a centroid of a set of points neighboring the current point, and
wherein the reconstructed point cloud is surrounded by a plurality of points belonging to different patches each having a respective weight, and
wherein each point in the set of points belonging to a same patch is equally weighted.

8. The method according to claim 1,
wherein the smoothing operation is a smoothing filter applied to the reconstructed point cloud, and
wherein the smoothing filter is selected from a plurality of smoothing filters.

9. The method according to claim 8,
wherein the selection of the smoothing filter is signaled with the compressed geometric data.

10. The method according to claim 8,
wherein the smoothing filter is selected based on a comparison of a statistical computation performed on the point cloud with one or more predetermined thresholds.

11. The method according to claim 1,
wherein the smoothing operation includes an adaptive erosion filter applied to the high resolution occupancy map.

12. The method according to claim 11,
wherein the adaptive erosion filter erodes one or more pixels located at a boundary between a set of occupied pixels and a set of unoccupied pixels, and
wherein each eroded pixel corresponds to an occupied pixel that is changed to an unoccupied pixel.

13. The method according to claim 12,
wherein the boundary is an occupied corner point in which the set of occupied pixels is an NxN block, and the set of unoccupied pixels surrounds two sides of the NxN block.

14. The method according to claim 12,
wherein the boundary is an unoccupied corner point in which the set of unoccupied pixels is an NxN block, and the set of occupied pixels surrounds two sides of the NxN block.

15. The method according to claim 12,
wherein the boundary is a vertical boundary between the set of occupied pixels and the set of unoccupied pixels.

16. The method according to claim 12,
wherein the boundary is a horizontal boundary between the set of occupied pixels and the set of unoccupied pixels.

17. A video decoder comprising:
processing circuitry configured to:
    receive compressed geometric data corresponding to a three dimensional (3D) space,
    receive a low resolution occupancy map associated with a data cloud,
    convert the low resolution occupancy map to a high resolution occupancy map,
    reconstruct a point cloud using the compressed geometric data and the high resolution occupancy map, and
    perform a smoothing operation on one of the (i) reconstructed point cloud and (ii) the high resolution occupancy map.

18. The video decoder according to claim 17,
wherein the smoothing operation includes a plurality of iterations of one or more smoothing filters applied to the reconstructed point cloud.

19. The video decoder according to claim 17,
wherein the smoothing operation includes an adaptive erosion filter applied to the high resolution occupancy map.

20. A non-transitory computer readable medium having instructions stored therein, which when executed by a processor in a video decoder, causes the processor to execute a method comprising:
    receiving compressed geometric data corresponding to a three dimensional (3D) space;
    receiving a low resolution occupancy map associated with a data cloud;
    converting the low resolution occupancy map to a high resolution occupancy map;
    reconstructing a point cloud using the compressed geometric data and the high resolution occupancy map; and
    performing a smoothing operation on one of the (i) reconstructed point cloud and (ii) the high resolution occupancy map.

* * * * *